MAGNETIC MEMORY DEVICE

Filed Nov. 28, 1951 2 Sheets-Sheet 1

Inventors:
JAMES B. CAMP and
COLEMAN H. WATSON,
by: Donald G. Dalton
their Attorney.

Inventors:
JAMES B. CAMP and
COLEMAN H. WATSON,
by: Donald G. Dalton
their Attorney.

2,735,987
Patented Feb. 21, 1956

2,735,987

MAGNETIC MEMORY DEVICE

James B. Camp, Fairfield, and Coleman H. Watson, Birmingham, Ala., assignors to United States Steel Corporation, a corporation of New Jersey Application November 28, 1951, Serial No. 258,699

1 Claim. (Cl. 333—29)

This invention relates to a magnetic memory device. The application of one of the present co-inventors, James B. Camp, Serial No. 258,700, filed the same date as the present application, shows a classifying and assorting mechanism for metal strip shear lines in which various operations are timed from a magnetic memory wheel driven at a rate proportional to the strip speed. The memory device of the present invention is especially adapted for use in that mechanism, although obviously its use is not thus limited.

An object of the invention is to provide an improved memory device which virtually eliminates mechanically moving parts, the only such part being a rotatable wheel on which the magnetic recording tracks are carried.

A further object is to provide an improved memory device which can control and time any number of different operations from a single rotatable wheel.

A more specific object is to provide an improved memory device which includes a wheel adapted to be driven at a rate proportional to the speed of a controlling movement (e. g., the strip in a shear line) and carrying circumferential magnetizable recording tracks, and which also includes recording heads and pickups spaced proportionately to devices for actuating the coil and actuated by the pickup.

In accomplishing these and other objects of the invention, we have provided improved details of structure, a preferred form of which is shown in the accompanying drawings, in which.

Figure 1:
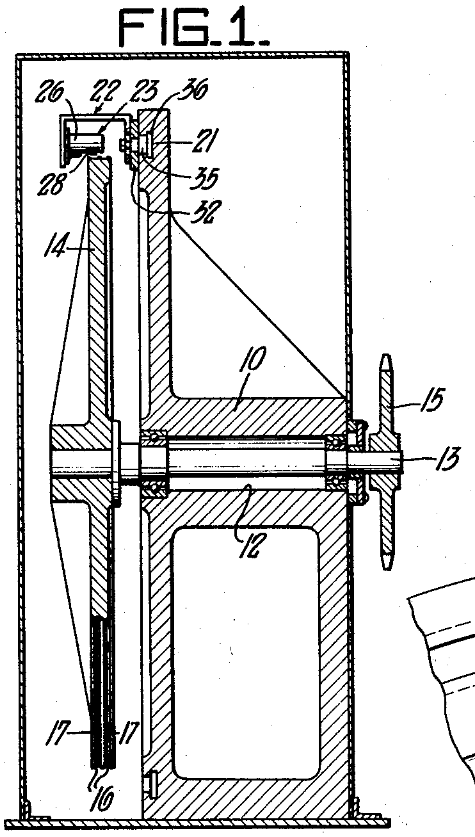
Figure 1 is a vertical sectional view of an improved memory device which embodies features of the present invention.

The memory device of the present invention comprises an upright stand 10 which can be fixed to any suitable support and has a central bearing passage 12. A rotatable shaft 13 extends through said passage and on its front end carries a memory wheel 14 and on its rear a drive sprocket 15. Both the stand and the wheel are of nonmagnetic material, preferably being formed from machined aluminum castings.

Figure 2:
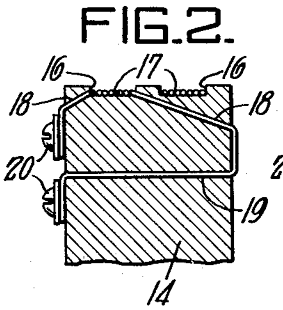
Figures 2 and 3 are vertical sectional views on a larger scale showing the preferred manner of fastening the recorder wire to the wheel.
Figure 3:
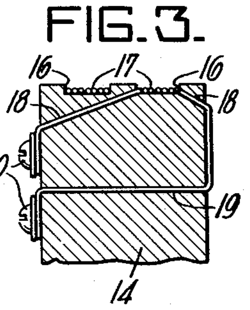
Figure 4:
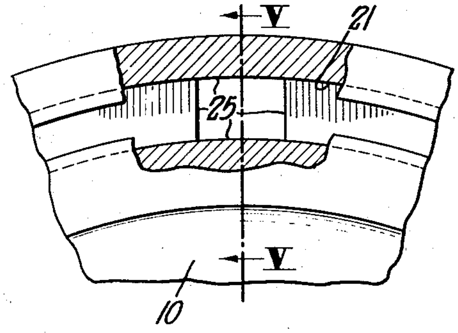
Figure 4 is a fragmentary front elevational view of the stand with the wheel removed.
Figure 5:
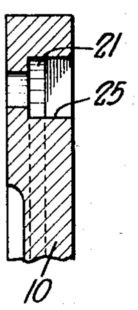
Figure 5 is a sectional view taken on line V—V of Figure 4.

The circumference of wheel 14 contains one or more shallow grooves 16, here shown as two in number. One layer 17 of magnetic recorder wire is wrapped around the circumference of the wheel the full width of each groove to form separate front and rear recording tracks. Figures 2 and 3 illustrate the preferred mode of fastening the ends of the wire to the wheel. For each groove the wheel has a pair of oblique openings 18 which extend in the same radial plane from the edges of the groove to the back and front faces of the wheel. Inwardly of the back opening the wheel has a transverse opening 19. Both ends of the wire are brought to the front of the wheel through these openings and secured thereto by screws 20.

The front face of stand 10 contains a T-slot 21, which encircles the wheel 14. Front and rear recording heads 22 and **22*a*, pickups 23 and 23*a* and erasers 24 and 24*a* are mounted in said slot adjacent the respective recording tracks. The stand contains at least one through opening 25 which extends from its back face into the bottom of slot 21** through which the mounting means for the recording heads, pickups, and erasers can be inserted.

Figure 6:
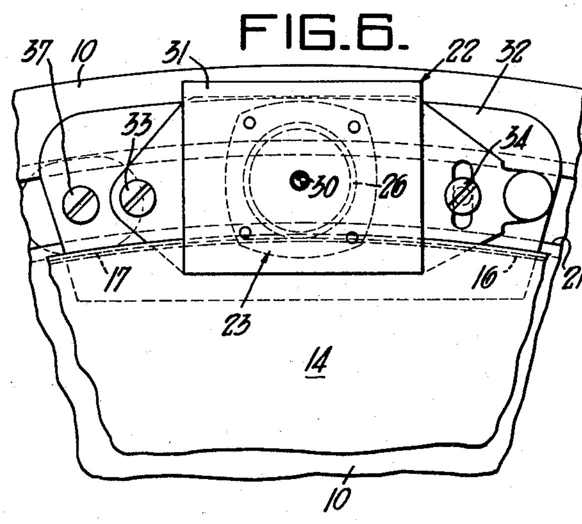
Figure 6 is a fragmentary front elevational view of the memory device including a recording head or pickup foı the front track.
Figure 7:
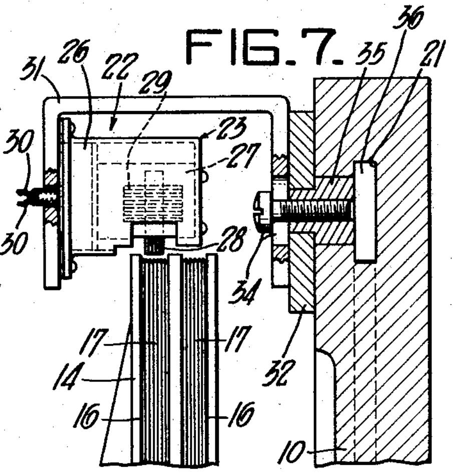
Figure 7 is an end elevational view, partly in section, of the parts shown in Figure 6.

Structurally the recording heads and pickups are similar. Figures 6 and 7 show details of a front recording head 22 or pickup 23. This head or pickup includes a housing 26, a sub-mounting 27 within said housing, a horse-shoe electromagnet 28 normally deenergized, and coils 29 around said magnet. Electrical leads 30 are connected to said coils. The housing 26 is fixedly mounted on a bracket 31, which is adjustably mounted on a plate 32. The adjustable mounting includes a pivot 33 and a slotted connection 34. Plate 32 is mounted on the stand 10 by guide pins 35 and nuts 36, which fit within the T-slot 21, and bolts 37 (Figure 6). The head or pickup can be positioned anywhere desired around the circumference of the wheel 14, and the spacing between the poles of magnet 28 and the recording track can be varied by adjustment of bracket 31 relative to plate 32.

Figure 8:
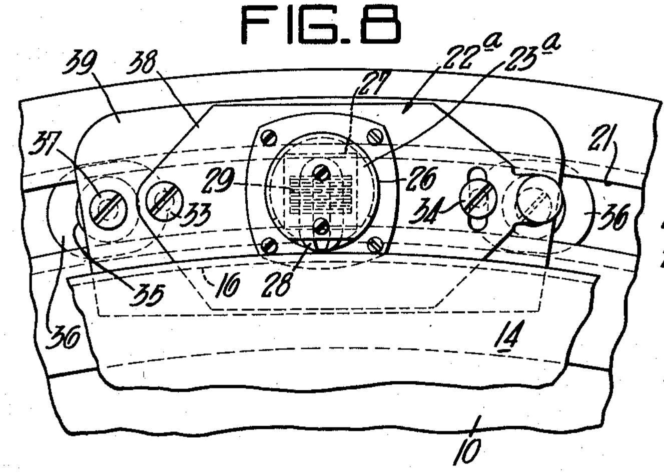
Figure 8 is a fragmentary front elevational view similar to Figure 6, but showing a recording head or pickup for the back track.
Figure 9:
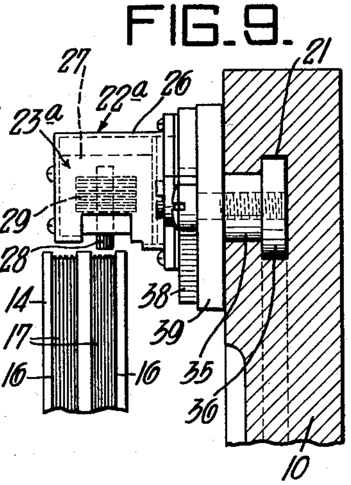
Figure 9 is an end elevational view, partly in section, of the parts shown in Figure 8.

Figures 8 and 9 show details of a back recording head **22*a* or pickup 23*a*. The housing and parts contained therein are similar, so it is unnecessary to repeat this description. Said housing is fixedly mounted on a plate 38 which is adjustably mounted on a plate 39 in a similar fashion to that in which bracket 31 is mounted. The mounting of plate 39 is similar to that of plate 32**.

Figure 10:
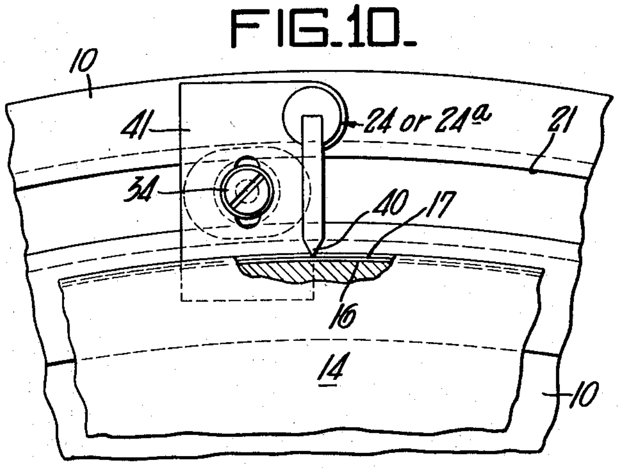
Figure 10 is a front elevational view similar to Figures 6 and 8, but showing one of the erasers.
Figure 11:
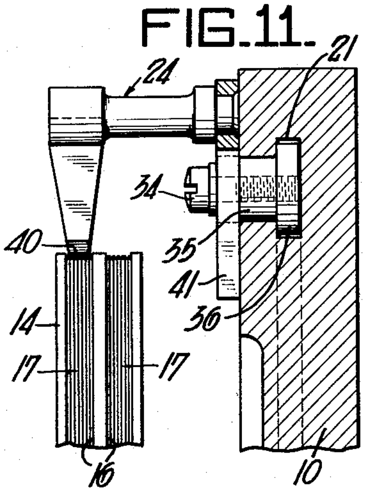
Figures 11 and 12 are end elevational views, partly in section, of the erasers for the front and back tracks respectively.
Figure 12:
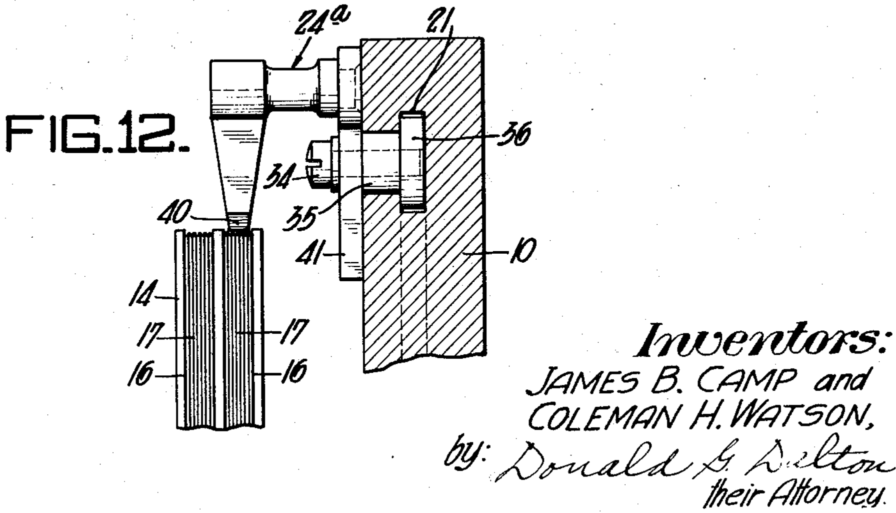

Figures 10, 11 and 12 show details of an eraser 24 or **24*a*. The eraser is formed of a permanent magnet ground to a point 40. It is mounted on a plate 41, which is mounted in the T-slot 21** in the same fashion as the corresponding plates of the recording heads and pickups.

In operation, wheel 14 is driven by an appropriate driving connection to its sprocket 15 at a rate proportional to some other movement, such as a shear line, as illustrated in the aforesaid Camp application. Normally all the recorder heads and pickups are deenergized. Electric impulses can be transmitted to the magnetizing coils 29 of any of the recording heads 22 or **22*a*. In the shear line example, such impulses can originate from a pin hole detector or an off-gauge thickness detector for recording heads of one track (front or rear) and from a photoelectric cell responsive to the passing of the leading edge of an imperfect sheet for a recording head of the other track. Such impulses energize the corresponding magnet 28** and magnetize a spot on the adjacent recording track. The magnetized spot can be either a mere point or it can be of considerable length depending on the length of time the recording head is energized.

When rotation of the wheel carries a magnetized spot on either recording track opposite one of the pickups for that track, passage of this spot induces an electric current in the coil 29 of that pickup. In the shear line example, the pickups on one track can be connected to a marker relay and to a storage circuit adapted to be cocked thereby and triggered by a switch on the shear. The spacing between one recording head and one pickup would be proportional to the spacing between the pin hole detector and the marker. Likewise the spacing between this recording head and the next pickup would be proportional to the spacing between the detector and the shear. The pickup on the other track can be connected to a deflector. The spacing between the recording head and the last named pickup would be proportional to the spacing between a photoelectric cell and the deflector.

The eraser 24 or 24*a* for each track follows the last pickup. When a magnetized spot on either track passes the eraser, it is removed and the track returns to its normal condition. It follows that the polarity of the pointed pole 40 of the eraser must correspond properly with that of the magnet 28 of the recording head. The latter has both a north and a south pole and the magnetized spot is produced in the space on the recording track which lies between them. The eraser subsequently must reverse the magnetism in this spot. Therefore, if the magnet 28, when energized, has first a south pole followed by a north pole, the point 40 must be a north pole, and, if the reverse is true, the point must be a south pole.

From the foregoing description it is seen that the memory device of the present invention is of simple construction and has only a single moving part, namely the bearing on which the wheel rotates. It is capable of very accurately timing various operations, such as actuation of a deflector in a shear line.

While we have shown and described only a single embodiment of the invention, it is apparent that modifications may arise. Therefore, we do not wish to be limited to the disclosure set forth but only by the scope of the appended claim.

We claim:

A memory device comprising a stand and a wheel rotatably mounted thereon and both being of nonmagnetic material, a magnetic recording track carried by said wheel around its circumference, the face of said stand on the side toward said wheel containing a continuous slot of T-shape in cross-section and circular outline surrounding the circumference of said wheel, the cross-arm portion of the T being within the stand and the stem extending through the face thereof, said stand having an access opening extending from the bottom of the cross-arm portion of said slot to the opposite face thereof, a plurality of nuts larger than the stem of said slot slidably mounted in the cross-arm portion of said slot and being insertable and removable through said opening, screw-threaded fasteners carried by each of said nuts and extending through the stem of said slot, a pair of plates each of which is carried by a different spaced pair of said fasteners for adjustment with said nuts circumferentially of said wheel, a magnetic recording head mounted on one of said plates, a magnetic pickup mounted on the other of said plates, said recording head and pickup projecting over said recording track and being adjustable toward and away from the wheel circumference, and a magnet eraser carried by another of said fasteners.

References Cited in the file of this patent

UNITED STATES PATENTS

| | | |
|---|---|---|
| 919,548 | Delhomme | Apr. 27, 1909 |
| 1,965,173 | Canton | July 3, 1934 |
| 2,403,009 | McCann | July 2, 1946 |
| 2,424,633 | Rieber | July 29, 1947 |
| 2,431,739 | Eilenberger | Dec. 2, 1947 |
| 2,468,224 | Munson | Apr. 26, 1949 |
| 2,631,800 | Pinkston | Mar. 17, 1953 |

FOREIGN PATENTS

| | | |
|---|---|---|
| 773,451 | France | Sept. 3, 1934 |